United States Patent [19]
Swanson et al.

[11] Patent Number: 4,936,348
[45] Date of Patent: Jun. 26, 1990

[54] ROTARY DIVERTER VALVE HAVING FLAT VALVE INTERFACES

[75] Inventors: Royal R. Swanson, DeLand; Raymond R. McNeice, DeBary, both of Fla.

[73] Assignee: Memtec America Corporation, Timonium, Md.

[21] Appl. No.: 381,203

[22] Filed: Jul. 18, 1989

[51] Int. Cl.⁵ .......................................... F16K 11/074
[52] U.S. Cl. ............................ 137/625.46; 251/174; 251/176; 137/341
[58] Field of Search .......................... 137/625.46, 341; 251/174, 176

[56] References Cited

U.S. PATENT DOCUMENTS

| | | | |
|---|---|---|---|
| 753,566 | 3/1904 | Geddes | 137/625.46 |
| 2,989,082 | 6/1961 | Ray | 137/625.46 |
| 4,554,942 | 11/1985 | Williams et al. | 137/625.46 X |
| 4,653,538 | 3/1987 | Tsutsui et al. | 137/625.46 |

*Primary Examiner*—Arnold Rosenthal
*Attorney, Agent, or Firm*—Waldron & Associates

[57] ABSTRACT

A rotary diverter valve for use in diverting fluid wherein the fluid port intersections between the valve body and rotary element are all at a flat planar interface to provide a flat, zero clearance, metal to metal contact. Live bolting is provided to adjust the contact pressure through a spherical bearing arrangement as will tolerate axial misalignment due to nonparallel loading to eliminate any need for critical torquing and widen manufacturing tolerances and reduce costs. When utilizing a replaceable transition plate between the rotary element and the valve body, wear on costly components is eliminated, and the valve is easy to maintain and repair.

14 Claims, 7 Drawing Sheets

ROTARY DIVERTER VALVE HAVING FLAT VALVE INTERFACES

This invention relates generally to diverter valves, and more particularly to a new and improved rotary diverter valve for use in filtration systems, said valve having a single flat valve interface to provide a zero clearance metal to metal contact, and other improved features to minimize leakage and improve and simplify operation, repair and maintenance thereof, and widen manufacturing tolerances to thereby reduce costs in the production of the valve.

BACKGROUND OF THE INVENTION

There are a number of manufacturing processes involving the formation of products from fluids such as "hot melts" and fluid monomer and polymer feed stocks, for example nylon and polyesters wherein it is essential to operate on a continuous flow basis. Such processes typically embody extrusion, injection, blow molding, coating and spraying techniques, to manufacture a variety of products, such as synthetic textile fibers, plastic tubing, plastic sheets and films, protective coatings, insulation on electrical wire and the like. Because of the difficulties in initially starting up such processes and cleaning the equipment after a shut down, it is highly desirable to operate such processes on a continuous, uninterrupted flow basis.

In most of the processes noted above, it is the usual practice to include a filter unit in the liquid flow stream to effect removal of impurities which, otherwise, could result in the production of defective products, or which could cause clogging of downstream equipment such as spinnerettes or extrusion dies. Naturally, such filters must be cleaned or replaced on a periodic basis. Rather than shutting down the process to clean or replace such filters, it is common practice to utilize a dual filter system to permit continued, uninterrupted operation. That is, the process fluid is routed through one filter system while the other is being cleaned, replaced or on standby. When the filter system in use becomes sufficiently fouled that cleaning or replacement is necessary, the process fluid is routed through the other filter system to permit such service. Thus one or the other of the two filter systems is always in use, while the other is not in use, and therefore, available for service or stand-by.

Because of the continuous nature of such processes, it is desirable, if not essential, that the diversion of process fluid from one filter system to the other be accomplished without any significant change in the fluid flow parameters, i.e. without any change in the fluid flow rate, pressure, temperature or the introduction of air into the system, any of which could adversely effect smooth functioning of the downstream equipment and the quality of the product being produced. In view of these demands, the diverter valves for diverting the process fluid from one filter system to the other must be highly specialized valves designed to effect such an uninterrupted change over, and typically include complex systems for bleeding fluid into the unused filter system to purge air therefrom and bring it up to pressure prior to a change over. The valve hardware is further complicated due to the rather rigorous service conditions, in that the process fluids may be highly corrosive, and may be at pressures as high as 5,000 psi and temperatures of 600° F. or more. Also complicating their use, is the fact that two such diverter valves, one for inlet and one for outlet, must be made to operate simultaneously in unison so that the change over can be made without any interruption or change in the flow characteristics.

While a great number of diverter valves have been developed or proposed, with the art continuing to progressively improve such valves, all prior art valves fall short of meeting all the desired requirements. For example, such valves may be unduly large, or difficult to operate at the fluid pressures involved, or difficult to clean, maintain and repair, or have a tendency to freeze up or develop leaks, necessitating frequent repairs.

Another common problem associated with many prior art diverter valves is that the design of the ports through which the hot fluids must pass is such that isolated areas are present which will lead to temporary entrapment and stagnation of a portion of the process fluid. As a result, such stagnated process fluid may be degraded, which will have a deleterious effect on the product being produced. For example, if polyvinyl chloride is being processed, a temporary stagnation thereof may cause the formation of hydrochloric acid and carbon which can contaminate the entire process. As another example, the stagnation of polyethylene will cause it to become cross-linked or carbonized and formed into a gel.

Most prior art diverter valves utilize a rotary plug valve because of its simplicity in construction and operation. Such valves comprise a cylindrical plug fitted within a mating cylindrical cavity in the valve body, with the cylindrical plug containing flow ports which can be aligned with differing flow ports in the valve body by an appropriate rotation of the plug. Such prior art rotary plugs have been shown to have a tendance to freeze or seize up. Additionally, repeated use of the valve will cause wear of the two cylindrical surfaces with the result that the tightness of fit is soon lost so that leakage then results. Because the cylindrical surfaces are fixed, there is no possibility for the cylindrical surfaces of the plug and valve body to be forced together and stop the leak. To eliminate this problem, more advanced diverter valves have utilized a frusto-conical plug so that the plug can be maintained in a tight fitted relationship regardless of wear between the plug and the valve body. Examples of such valves can be found in U.S. Pat. Nos. 3,455,357, Zink and 3,935,108, Forgues. Such a valve construction, however, has an even greater tendency to freeze or seize up. Additionally, should the frusto-conical plug be loosened or otherwise caused to be lifted even slightly from its conical seat in the valve body, leakage of excessive magnitude will result.

In some instances in the prior art, diverter valves have utilized slide plates as the active mechanism to divert the flow, thereby avoiding the more complicated cylindrical or conical valve interfaces, and thereby be able to maintain closer tolerances at the valve interfaces. Such slide plate valves, however, typically require non-metallic resilient seals to control or prevent leakage. Experience has shown that such seals will not withstand the high pressures and temperatures of service for a significant period of time, and must therefore be frequently replaced.

An improved slide plate diverter valve is disclosed in U.S. Pat. No. 4,334,552, Blanchard, which provides a zero clearance, metal-to-metal contact at the valve interface. The seal at the interface is maintained and controlled by a plurality of bolts which extend along both sides of the slide plate to adjust the interface pressure between the slide plate and the valve body manifold. While this diverter valve is capable of maintaining an excellent seal without the use of resilient materials, and also provides good flow through characteristics to reduce any low flow areas, considerable effort and skill is required to torque all the bolts to the exacting degree essential tc properly tighten the slide plate against the valve body manifold. In addition, the manufacturing tolerances for machining the slide plate and those surfaces in contact therewith are exceptionally close, and accordingly, service and repair thereon is time consuming and costly.

SUMMARY OF THE INVENTION

This invention concerns a new and improved rotary diverter valve which incorporates the advantageous features of both the rotary diverter valves and slide plate diverter valves without the disadvantages of either. While the valve of this invention utilizes a rotary element as the moving element, the valve is not a true plug valve in that the valve interface, i.e. the interface between the valve components containing the fluid ports which must be changeably aligned, is not cylindrical or conical, but is rather a flat planer surface providing a zero clearance metal-to-metal interface seal, thus eliminating the use of any external packings, gaskets or seals. Live bolting is provided to maintain a proper seal between the rotary diverter and the valve body through a unique arrangement of beveled spring washers and a spherical bearing arrangement, which will tolerate axial misalignment due to nonparallel loading thereby eliminating any need for critical torquing of the live bolts. In addition, the valve of this invention utilizes a transition or wear plate at the valve interface, which is low in cost to produce and easy to replace, and serves to prevent any wear on the more expensive valve body. Because of these features, manufacturing tolerances are significantly relaxed while the skill and time required to operate, repair and maintain the valve is greatly reduced. In addition, the ports through the valve components are exceptionally smooth flowing to assure the absence of any dead spaces therein, and thus greatly minimizing the possibility of process fluid stagnation.

DETAILED DESCRIPTION OF THE INVENTION

Figure 1:
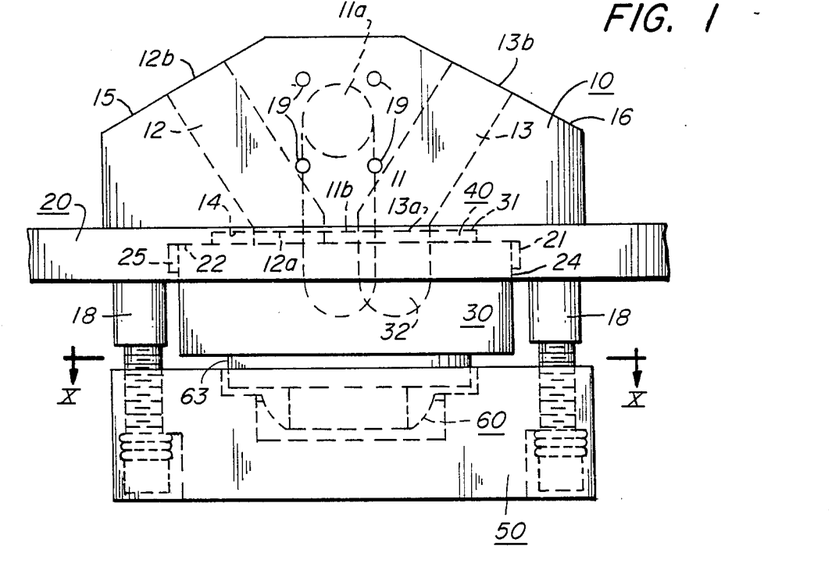
FIG. 1 is a front elevational view of a diverter valve constructed in accordance with this invention, showing some of the hidden portions with dashed lines.
Figure 2:
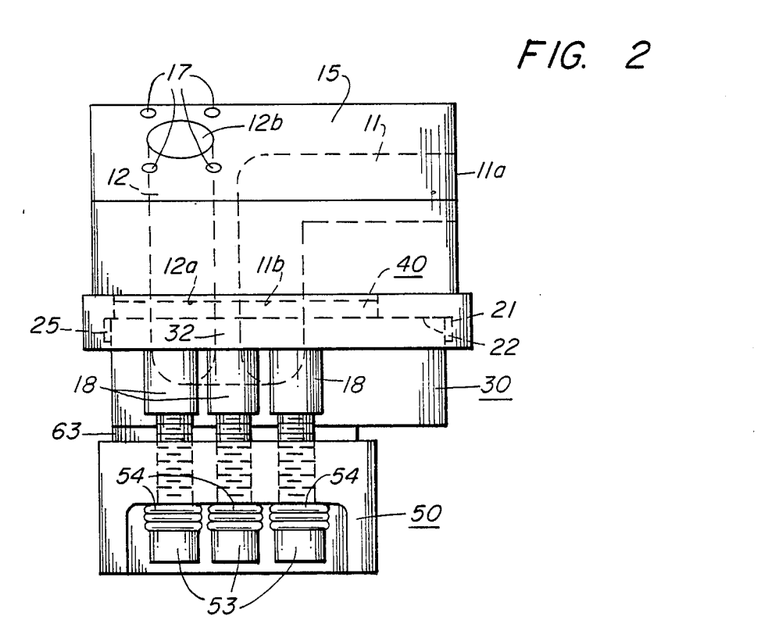
FIG. 2 is a side elevational view of the diverter valve shown in FIG. 1, showing some of the hidden portions with dashed lines.
Figure 3:
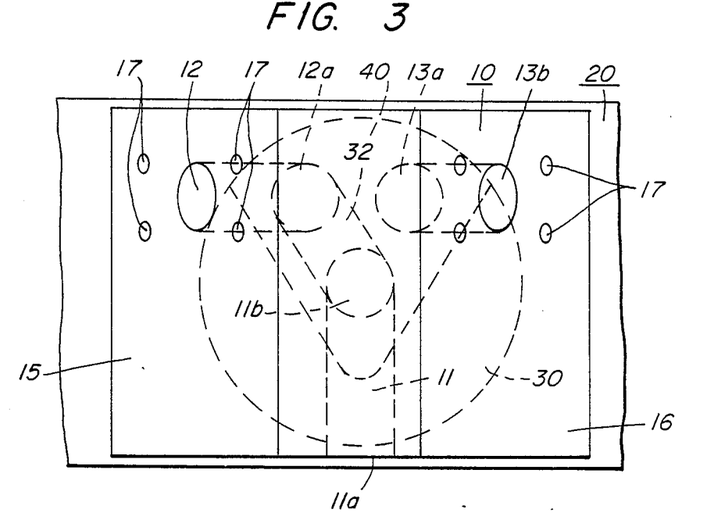
FIG. 3 is a top view of the diverter valve shown in FIGS. 1 and 2, showing some of the hidden portions with dashed lines.

Reference to FIGS. 1, 2 and 3 will illustrate one embodiment of a rotary diverter valve constructed in accordance with this invention. As shown, the valve comprises a valve body 10 mounted onto the upper surface of a mount plate 20, while a rotary diverter 30, is rotatably positioned within a cylindrical recess on the underside of mount plate 20 and against a transition plate 40. Transition plate 40 is held within a mating opening in transition plate 20 and there maintained by the force of rotary diverter 30 holding it tightly against the bottom of valve body 10. Rotary diverter 30 is indirectly held in place by a load block 50, bolted to the underside of mount plat 20, whereby a spherical bearing arrangement 60 is interposed between load block 50 and rotary diverter 30 such that the spherical bearing arrangement 60, will apply a uniform upward pressure on the bottom surface of rotary diverter 30 even in the event of nonparallel loading and misalignment of the load block 60.

Figure 14:
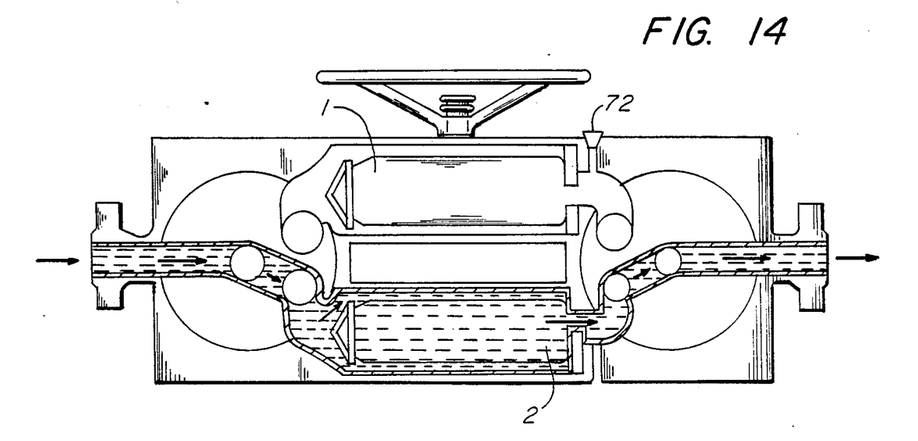
FIG. 14 is a schematic sectional view of a filtration system incorporating the diverter valves of this invention showing fluid flow through one filter system.
Figure 15:
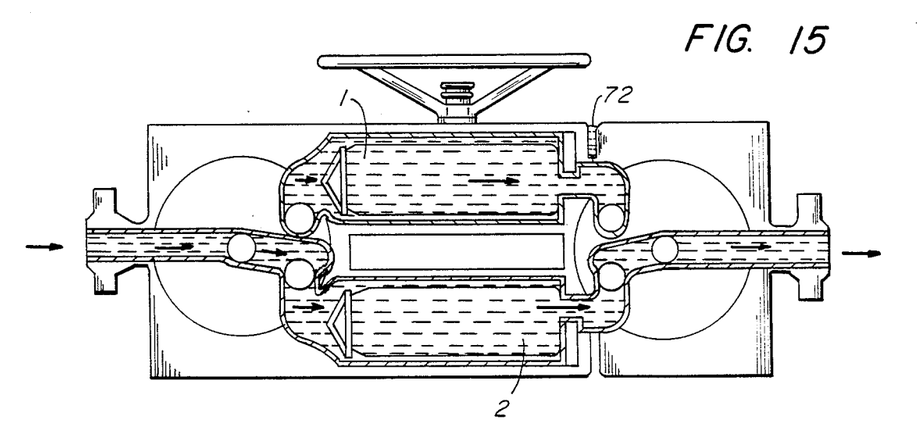
FIG. 15 is a view of the system shown in FIG. 14 showing fluid flow during the transition period.
Figure 16:
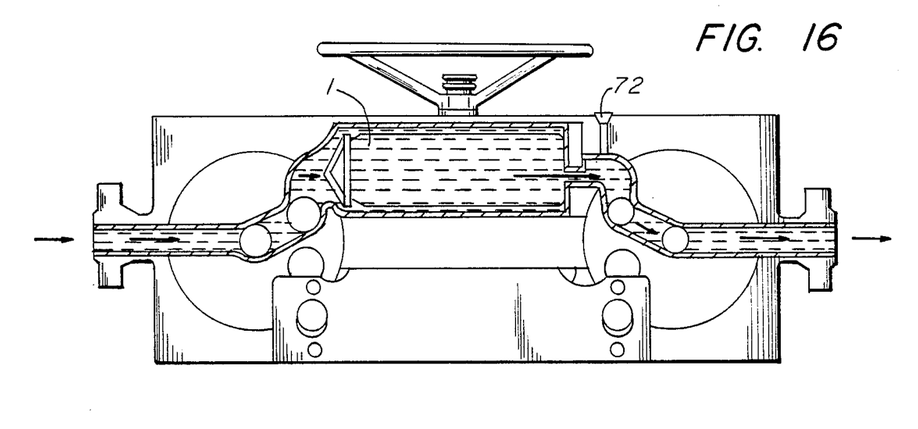
FIG. 16 is a view of the system shown in FIGS. 14 and 15 showing fluid flow after the change over has been completed.

Valve body 10 is a solid block of material, preferably a metal such as steel, and is provided with an inlet port and two outlet ports for directing the process fluid to either of the two filter systems. Specifically, inlet port 11 is provided through valve body 10 to admit the process fluid horizontally through the front thereof through opening 11a, and directing the fluid downwardly to exit through opening 11b at the approximate center of the flat bottom surface 14 on valve body 10. Two outlet ports 12 and 13 are also provided through valve body 10 behind inlet port 11, with their inlet openings 12a and 13a in the flat lower surface 14, thereof, and are radially offset from opening 11b, such that ports 12 and 13 extend diagonally upward and divergent from each other to outlet openings 12b and 13b respectively on the sloped upper surfaces 15 and 16 respectively of valve body 10. Bolt holes 17 are provided in upper surfaces 15 and 16 around openings 12b and 13b for mounting an appropriate conduit line to receive the process fluid and deliver to each of the two filter systems 1 and 2 (FIGS. 14, 15 and 16). In a like manner, bolt holes 19 are provided around inlet 11a for mounting an appropriate conduit for admitting the process fluid into inlet port 11. Valve body 10 is secured onto mounting plate 20 by six lugs (not shown) threaded into the bottom surface thereof such that the lugs will extend through mounting plate 20 and secured by six double lug nuts 18.

Figure 4:
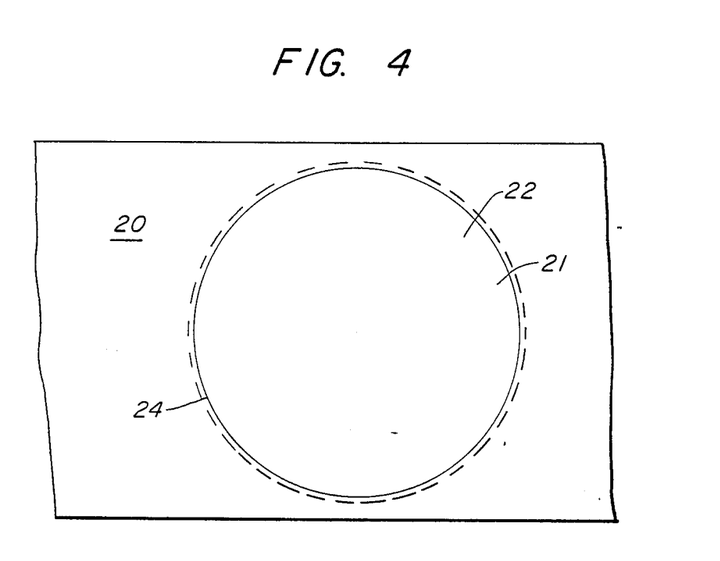
FIG. 4 is a top view of the mount plate.

Mounting plate 20, as shown in more detail in FIG. 4, is a conventional metallic plate, such as a steel plate, provided with an opening therethrough. The under side of the opening 21, centrally positioned under valve body 10, is a cylindrical cavity adapted to receive the upper portion of rotary diverter 30. The upper portion of the opening, 22 may be of any desired cross-section sufficient to receive transition plate 40, and as shown, is also a cylindrical opening having a diameter slightly smaller than the lower opening 21, so that a downward facing surface or flange 23 results, which, but for the transition plate 40, would limit the upward position of rotary diverter 30. Another small flange 24, annular in configuration, is provided around the lower edge of cylindrical opening 21 on the underside of mounting plate 20 for the purpose of retaining a radial bearing 24 for engaging the cylindrical upper periphery of rotary diverter 30.

Figure 5:
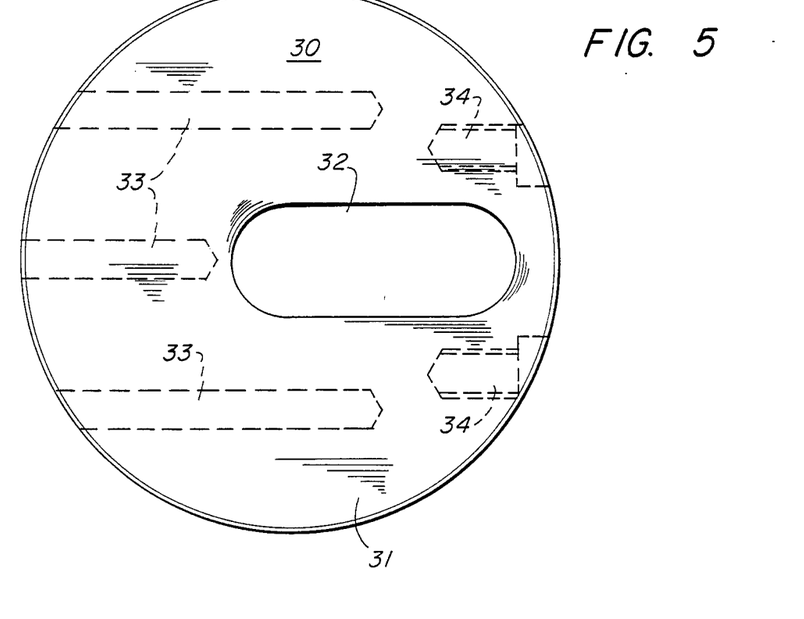
FIG. 5 is a a top view of the rotary diverter as utilized in the diverter valve shown in the above drawings.
Figure 6:
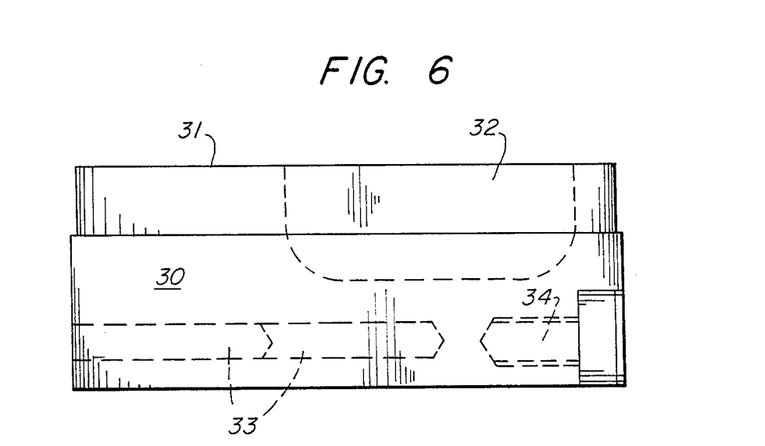
FIG. 6 is a side view of the rotary diverter as shown in FIG. 5.
Figure 13:
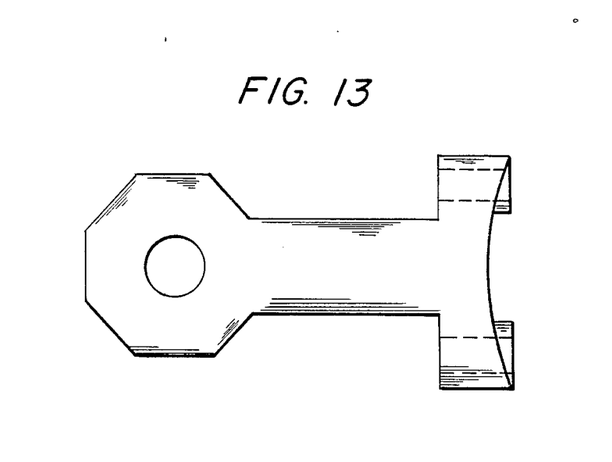
FIG. 13 is a plan view of a typical lever arm as attached to the rotary diverter for the purpose of rotating the rotary diverter.

Rotary diverter 30, also preferably formed of a hard metallic material such as steel, has a short cylindrical form with a radius sufficient to rotatably fit within the cylindrical portion of opening 21 in mounting plate 20, with the perimeter of its flat upper surface 31 abutting the lower surface of transition plate 40. Annular bearing 25, positioned within cylindrical opening 21 in mounting plate 20 and there retained by flange 24, must be dimensioned to provide a snug but rotatable fit around cylindrical wall or rotary diverter 30. The flat upper surface of rotary diverter 30 is provided with a elongated groove or channel 32 machined radially therein. Elongated groove or channel 32 is such that its sides and ends are radially rounded, with one end thereof at the axial center of surface 31 so that said end will mate with circular opening 11b in valve body 10, while the other end of channel 32 can be made to mate with either openings 12b or 13b, depending upon the rotational position of rotary diverter 30. Accordingly, rotation of rotary diverter 30 will not affect the alignment of channel 32 with opening 11b at the axial center, but will cause the outer end of channel 32 to rotate such that the outer end of channel 32 can be made to be aligned with either opening 12b or 13b in valve body 10 as desired. Because of this operation, it is apparent that openings 12b and 13b must be radially eqidistant from opening 11a. Holes 33 may be provided within the body of rotary diverter 30 for the purpose of inserting heating elements (not shown) and a temperature sensor or thermo-switch (not shown) if desired. Such heating elements and switch may be necessary in some applications where the process fluid is a melt which must be maintained at a given temperature. Some engaging means, such as holes 34, must also be provided for the purpose of attaching an activating lever (FIG. 13) which will cause the rotary diverter 30 to be rotated as desired to activate the diverter valve. Such a lever arm may be manually, electrically or hydraulically operated, and when two such valves are incorporated into a dual filter apparatus, both valves are normally operated in unison through a single activating means. In a preferred arrangement, one such valve is provided on on each the inlet and outlet of the filter apparatus, such that the lever arms extend thereaccross towards each other, so that their ends are in close proximity. The activating means is therefore attached to each of the two lever arms so that they can be rotated in unison so they are simultaneously operated.

Figure 11:
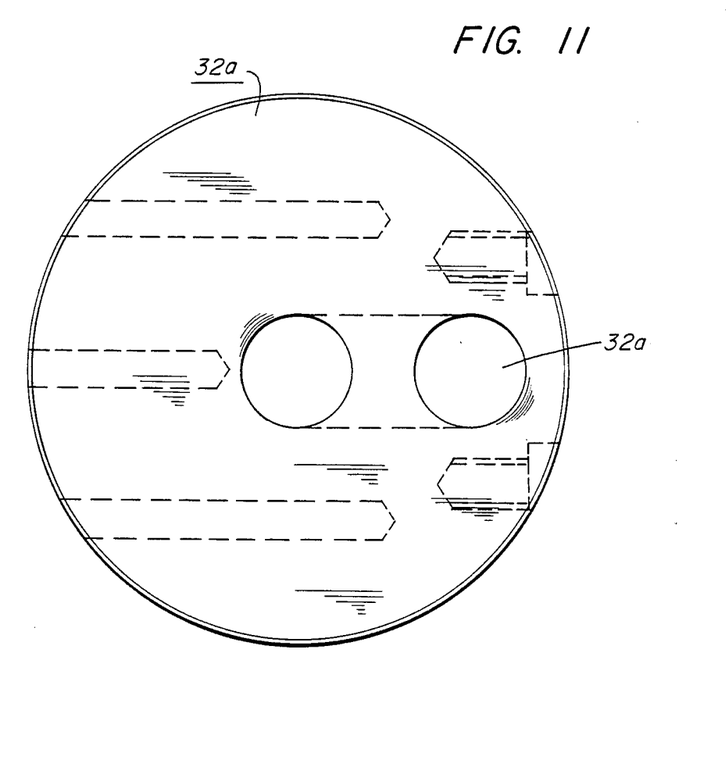
FIG. 11 is a top view of another embodiment of a rotary diverted as an alternative to that shown in FIG. 5.
Figure 12:
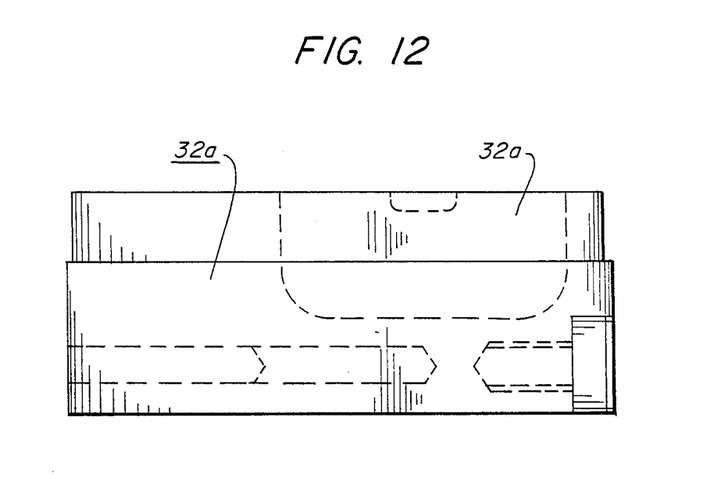
FIG. 12 is a side view of the rotary diverter shown in FIG. 11.

With reference to the above described rotary diverter, the channel 32 machined into the upper face thereof is perhaps the easiest way to effect such a passageway for the process fluid. It should be apparent however, that the cross-section of the passageway through the rotary diverter 30 is in the form of a "D", thus having corners which could, in some processes lead to stagnation problems. It is apparent that a circular passageway could be provided which extends entirely through the body of the rotary diverter with openings thereto corresponding to the openings in the valve body, as do the circular ends of the channel. FIGS. 11 and 12 illiterate such an alternative embodiment, wherein channel 32a consists of a passageway having a circular cross-section entirely within the body of rotary diverter 30a. While the manufacture of such an alternative design would by more costly, The provision of such a circular passageway through the body of the rotary diverter provides the advantage of maintaining a uniform circular cross-section of all passageways throughout the valve, to even further minimize the possibility of stagnation of the process fluid. Accordingly, such an alternative embodiment would be particularly beneficial in those processes where stagnation can be a serious problem.

Figure 7:
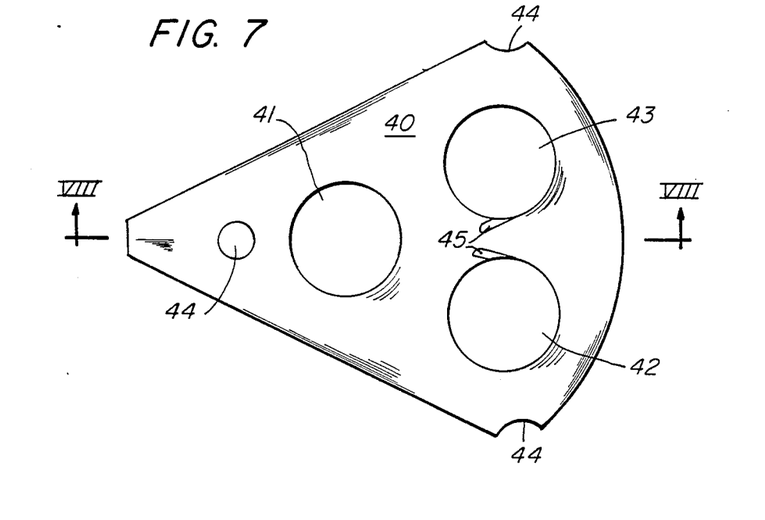
FIG. 7 is a top view of the transition plate as utilized in the diverter valve shown in the above drawings.
Figure 8:
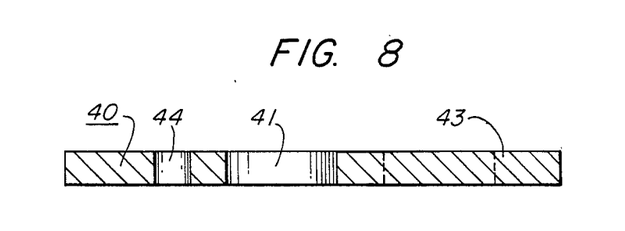
FIG. 8 is a sectional side view of the transition plate shown in FIG. 7 with the section taken through the radial center.

Transition plate 40, shown in greater detail in FIG. 7 and 8, is a pie shaped metal plate, such as steel, and serves to form a downward extension of valve body 10 extending to circular opening 21 in mounting plate 20, and functions as a replaceable wear plate between valve body 10 and rotary diverter 30. Transition plate 40 is provided with three holes therethrough, namely holes 41, 42 and 43 which are directly aligned with openings 11b, 12a and 13a respectively in the bottom surface of valve body 10. Transition plate 40 is also provided with holes or partial holes 44 adapted to snuggly fit around dowel pins (not shown) extending from the bottom of valve body 10 so that it may be properly mated with the bottom of the valve body 10, such that the holes therethrough, namely holes 41, 42 and 43 are perfectly aligned under openings 11b, 12a and 13a as described above. In addition, the dowel pins will serve to prevent rotation of the transition plate 40 when the rotary diverter 30 is activated. Transition plate 40 is accordingly interposed between valve body 10 and rotary diverter 30, and is merely a removable extension of valve body 10, thereby serving the purpose of preventing any physical wear on the surface of valve body 10 due to the frictional engagement. Hence, valve body 10, which is rather expensive to produce, is spared of any wear. Because the bottom surface of transition plate 40 is pie shaped, its lower surface is rather uniform around the openings 41, 42 and 43. Therefore, the sealing pressure of rotary diverter 30 biased thereagainst is concentrated at the center of this surface area so that the sealing pressure is uniform at each of the openings 41, 42 and 43. Transition plate 40 is intended to be a low cost replaceable component to prevent wear on the valve body 10, and accordingly, it will wear because of its frictional engagement with rotary diverter 30. All wear is therefore, primarily limited to transition plate 40 and rotary diverter 30, which are intended for occasional replacement anyway, and can quickly, easily and inexpensively be replaced when necessary without the need for special skills or special tools. It should be apparent therefor, that while transition plate 40 is a very desirable feature of this invention, it is not essential as rotary diverter 30 could be placed into direct contact with valve body 10 if desired.

Figure 9:
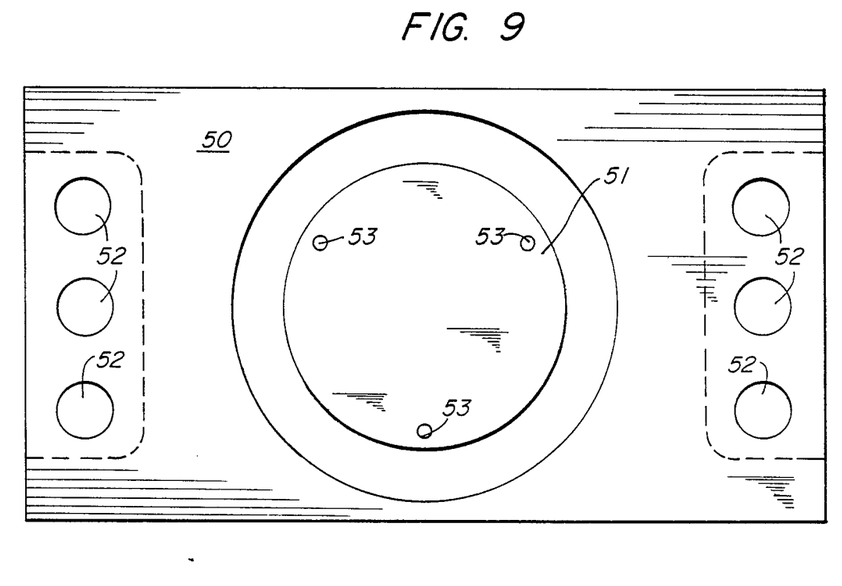
FIG. 9 is a top view of the load block as utilized in the embodiment shown in the above drawings.

Load block 50 is another metallic component, such as a steel fabricated piece, and is bolted to the underside of mounting plate 20 for the purpose of indirectly holding rotary diverter 30 against transition plate 40. As can be more clearly seen in FIGS. 9 and 10, load block 50 is provided with a cylindrical cavity 51, centrally positioned in the upper surface. In addition, three holes 52 are provided on each of opposite sides of load block 50, each of which is adapted to receive a bolt 53 and compression spring washer 54 for the purpose of live bolting load block 50 to the under side of mounting plate 20, such that load block is biased against spherical load bushing arrangement 60, which in turn is biased against rotary diverter 30 to hold rotary diverter 30 tightly against transition plate 40. Accordingly, through proper adjustment of bolts 53, the pressure of rotary diverter 30 against transition plate 40 can be suitably adjusted to maintain the desired zero clearance, metal to-metal contact.

Figure 10:
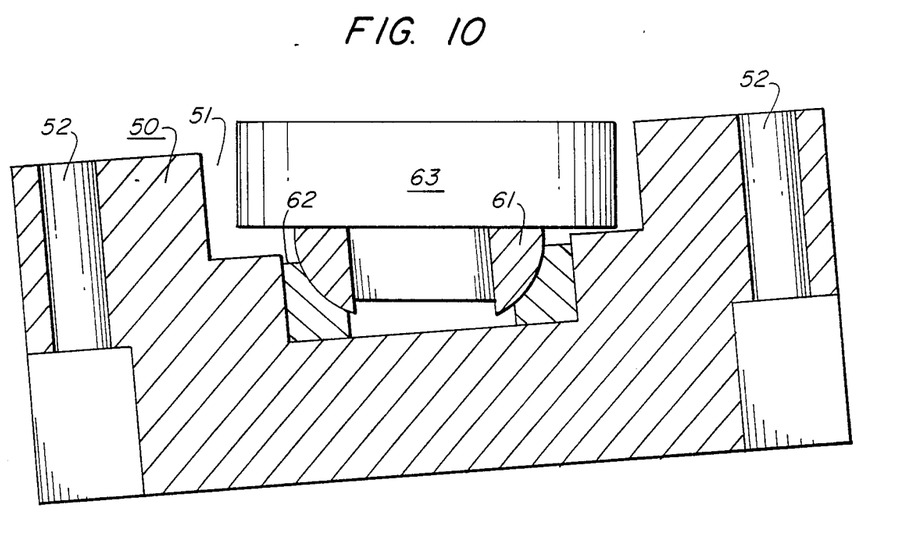
FIG. 10 is a sectional side view of the load block shown in FIG. 9, further illustrating the spherical bearing arrangement therewithin.

Spherical bushings, such as spherical load bushing 60, more clearly shown in FIG. 10, are well known in the prior art, and typically consist of a collar 61 having a partially spherical outer surface, engaged in a mating bushing 62, having a negative, partially spherical surface of the same radius. As shown in FIG. 10, bearing shaft 63 is provided such that spherical collar 60 can be positioned around the lower end thereof. The upper surface of bearing shaft 63 is adapted to engage the bottom of rotary diverter 30. Bushing 62, is disposed at the bottom of cylindrical cavity 51, and adapted to receive collar 61. As load block 50 is tightened upward, the upper surface of bearing shaft 63 will engage the lower surface of rotary diverter 30 biasing it upward against transition plate 40. Because of the spherical bushing arrangement 60 the adjustment of load block 50 is not critical as the spherical bushing arrangement 60 will compensate for any misalignment or unequal torquing of the live bolts 53. As shown in FIG. 10, bearing shaft 63 and collar 61 are shown in a misaligned position to illustrate that collar 61 and bushing 62 are properly engaged even in this misaligned position. Holes 53 are provided in the bottom of cavity 51 near the edge thereof for the purpose of inserting a narrow tool to facilitate to removal of bushing 62 when so desired.

In addition to the above described fundamental features of this inventive diverter valve, the valve may also include optional features, such as a bleed system for bleeding the process fluid into the unused filter housing prior to change over for the purpose of purging air therefrom. With reference to the enclosed drawings, the bleed system is effected by providing a small lateral cut-out 45 in transition plate 40 (FIGS. 7 and 8). Accordingly, by rotating rotary diverter 30 in the inlet valve by a small amount in the direction of the offline filter housing, the processing fluid can be bled into the offline filter housing via the cut-out 45, without cutting off the flow into the online sed filter housing. This operation is more clearly depicted in FIG. 15. It should be noted, however, that such a bleed cut-out or notch 45 is not essential, even for bleeding, in that bleeding can be effected by merely permitting the passageway in the rotary diverter to very slightly overlap the edge of the port leading to the previously unused filter housing, so that the same result is effected. By either technique, however, it is obvious that the two outlet ports in the filter housing must be close enough together so that the passageway in the rotary diverter can continue to maintain feed of the process fluid into the online filter housing, while bleeding a small amount of the fluid into the offline filter housing.

As is a common practice in all such valves, it is preferred that those components in frictional engagement be plated with dissimilar metals for the purpose of preventing galling. Since such techniques and metal choices are well known in the art, further discussion is not required here.

In operation, two such diverter valves must be provided in the filtration system, one to control the fluid feed into the filters, and one to control the fluid feed out of the filters. As schematically shown in FIG. 14, the two diverter valves are properly set to admit processing fluid through filter housing 2, while filter housing 1 is on standby. Prior to switching the flow over to filter housing 1, the inlet rotary diverter is only partially diverted towards the other filter housing, i.e filter housing 1, to bleed processing fluid into filter housing 1, as illustrated in FIG. 16. Then, after filter housing 1 is properly filled with the processing fluid and all air bled therefrom, the rotary diverter can be completely diverted to pass processing fluid through filter housing 1, and Filter housing 2 can then be removed for service. In applications where bleeding is desired or essential, the filter housing is normally provided with a bleed outlet through which the air is purged from the system, such as outlet 72 shown in FIGS. 14, 15 and 16. Such outlets 72 must be closed during normal operation of the filtering operation, and opened only during the bleeding operation.

In view of the above description it should be rather apparent that the rotary diverter valve of this invention would be rather simple to repair and maintain. As noted above, the valve has been designed so that the wear of the moving parts will be primarily concentrated on the transition plate 40 and rotary diverter 30. When these two components do become worn sufficiently that replacement is desired, it is a simple matter to do so. Specifically, removal of bolts 53, which can be done in a matter of minutes, will permit the removal of load block 50 and spherical bearing assembly 60 as well as the lowering of rotary diverter 30, which will expose transition plate 40. Transition plate 40 is then merely detached from the bottom surface of valve body 10 without any need to remove valve body 10 or disconnect any of the fluid piping attached thereto. When a new transition plate 40 is properly inserted along with a replacement rotary diverter, the load block and spherical bearing arrangement are replaced and held in place by reattaching the six bolts 53 and compression spring washers 54.

In addition to the above, it should be apparent that numerous modifications could be made without departing from the spirit of the invention. For example, the arrangement of the fluid passages through the valve body 10 could be arranged in any form desired provided the valved inlets and outlets are on a flat surface of the valve body. The mounting plate 20 which serves primarily as a body to hold the components together, can be modified to meet any desired need. In most applications, the mounting plate will additionally serve the function of providing a means for securing the valve or valves to the filter housing hardware, or may in fact be a part of the filter housing hardware. In some applications, a single mounting plate can be utilized for holding both diverter valves, with or without serving the additional function of providing a means for mounting the valves to filter housing. In other applications, the mounting plate could be completely eliminated if the valve were redesigned such that the load block would bolt directly to the filter housing. As already noted, the transition plate is not absolutely essential, but is desired to prevent wear on the valve body. The transition plate too could be produced to have any desired configuration, as essential to form a replaceable extension of the valve body. As already noted, the rotary diverter can be designed to provide a plurality of differing passageways therein depending on the degree to which one chooses for minimizing stagnation of the process fluid. It should also be apparant that the diverter valve as disclosed and taught herein can offer similar advantages in various applications other than filtration.

What is claimed is:

1. A rotary diverter valve comprising:
   a. a valve body having an inlet port and two outlet ports therethrough such that each of the three ports have an opening thereto through a single flat planar surface of said valve body, said openings spaced such that the openings to said outlet ports are radially equidistant from the opening to said inlet port;
   b. a rotary diverter having a flat planar surface and adapted to be rotatably positioned with its flat planar surface adjacent to said flat planar surface on said valve body, said rotary diverter having a passageway therein communicating with said flat planar surface, and of sufficient size and dimension as said passageway will extend from said inlet port to either of said outlet ports;
   c. a load block bolted to said valve body and adapted to be biased against said rotary diverter to hold said rotary diverter in place and bias it against said valve body,
   d. means for partially rotating said rotary diverter sufficient to rotate said rotary diverter on the axis of said opening to said outlet port on said valve body so that one end of said passageway will always be aligned with said inlet port, while the opposite end of said passageway can be selectively aligned with either of the openings to said outlet ports.

2. A rotary diverter valve according to claim 1 in which said passageway in said rotary diverter consists of a channel formed into said flat planar surface.

3. A rotary diverter valve according to claim 1 in which said passageway in said rotary diverter consists of a circular passageway within the body of said rotary diverter.

4. A rotary diverter valve according to claim 1 in which a transition plate, having three holes therethrough is interposed between said valve body and said rotary diverter such that said three holes will mate with said three ports in the flat planar surface, to thereby prevent any wear on the surface of said valve body.

5. A rotary diverter valve according to claim 4 in which said transition plate is pie shaped in form to form a uniform surface area around said three holes so that a uniform sealing pressure is effected at the three holes when said rotary diverter is biased thereagainst.

6. A rotary diverter valve according to claim 4 in which said transition plate is coated with a dissimilar material than is said rotary diverter.

7. A rotary diverter valve according to claim 1 further having means thereon to permit bleeding.

8. A rotary diverter valve according to claim 7 in which said means to permit bleeding consists of a small lateral cut-out adjacent to each of said outlet ports such that a small rotation of said rotary diverter will cause said passageway to continue to communicate with one said outlet while also communicating with said cut-out associated with the other adjacent outlet.

9. A rotary diverter valve according to claim 1 in which a spherical bearing arrangement is interposed between said rotary diverter and said load block for the purpose of providing a uniform upward pressure against the bottom of said rotary diverter regardless of any misalignment of said load block or torque inequality in the bolts holding said load block in place.

10. A rotary diverter valve according to claim 9 in which said spherical bearing arrangemeht comprises a bearing shaft adapted to be biased against the bottom of said rotary diverter, with the lower end thereof having a spherical collar engaging a spherical bushing fitted to said load bearing.

11. A rotary diverter valve according to claim 9 in which said load block is bolted to the underside of said valve body by live bolting.

12. A rotary diverter valve according to claim 9 further including means for heating said rotary diverter.

13. A rotary diverter valve according to claim 9 in which a mounting plate is provided to which said valve body is secured, said mounting plate having an opening therethrough adjacent to said valve body adapted to receive said rotary diverter adjacent to said valve body, and said means for adjustably biasing said rotary diverter against said valve body is bolted to said mounting plate.

14. A rotary diverter valve according to claim 13 in which said means for biasing said rotary diverter against said valve body is bolted by a live bolting arrangement.

* * * * *